(12) United States Patent
Posselt et al.

(10) Patent No.: US 10,461,615 B2
(45) Date of Patent: Oct. 29, 2019

(54) ROTOR FOR A SLIP RING MOTOR AND SLIP RING MOTOR

(71) Applicants: LINDE AKTIENGESELLSCHAFT, Munich (DE); WEG EQUIPAMENTOS ELECTRICOS S.A., Jaragua Do Sul/SC (BR)

(72) Inventors: Heinz Posselt, Bad Aibling (DE); Marco Kleis, Raubling (DE); Cesar Luis Pinter, Jaraguà do Sul (BR)

(73) Assignees: LINDE AKTIENGESELLSCHAFT, Munich (DE); WEG EQUIPAMENTOS ELECTRICOS S.A., Jaragua Do Sul/SC (BR)

(*) Notice: Subject to any disclaimer, the term of this patent is extended or adjusted under 35 U.S.C. 154(b) by 182 days.

(21) Appl. No.: 15/364,323

(22) Filed: Nov. 30, 2016

(65) Prior Publication Data
US 2017/0163134 A1 Jun. 8, 2017

(30) Foreign Application Priority Data
Dec. 3, 2015 (DE) .......... 10 2015 015 679

(51) Int. Cl.
H02K 17/02 (2006.01)
H02K 13/02 (2006.01)
H02K 1/22 (2006.01)
H02K 13/00 (2006.01)

(52) U.S. Cl.
CPC ............. *H02K 17/02* (2013.01); *H02K 1/22* (2013.01); *H02K 13/003* (2013.01); *H02K 13/02* (2013.01)

(58) Field of Classification Search
CPC ...... H02K 13/003; H02K 13/02; H02K 17/22; H02K 3/52; H01R 39/00; H01R 39/08; H01R 39/10; H01R 39/14; H01R 39/18; H01R 39/34
USPC .................. 310/71, 128, 143, 147, 232
See application file for complete search history.

(56) References Cited

U.S. PATENT DOCUMENTS

| | | | | |
|---|---|---|---|---|
| 3,663,770 A | * | 5/1972 | Groskopfs | H01R 39/64 200/11 R |
| 3,988,049 A | * | 10/1976 | Williams | H01R 39/00 439/23 |
| 4,424,947 A | * | 1/1984 | Adams | B64D 15/12 219/202 |
| 5,124,608 A | * | 6/1992 | Lawrence | H01R 39/64 310/143 |

* cited by examiner

Primary Examiner — Nguyen Tran
(74) Attorney, Agent, or Firm — Millen, White, Zelano & Branigan, P.C.; William Nixon

(57) ABSTRACT

A rotor for a slip ring motor includes a hollow shaft with an open end, a plurality of electric cables, and a cable guide arranged in the open end guiding the electric cables from inside the hollow shaft towards connection points of the electric cables outside of the hollow shaft.

13 Claims, 4 Drawing Sheets

ROTOR FOR A SLIP RING MOTOR AND SLIP RING MOTOR

The present invention relates to a rotor for a slip ring motor as well as to a slip ring motor.

Air separation plants use large-size compressors to compress air. The compressors are driven by induction or asynchronous motors, typically with a power output of 12 to 18 megawatts (MW).

An induction or asynchronous motor an AC (alternating current) electric motor in which the electric current in the rotor needed to produce torque is obtained by electromagnetic induction from the magnetic field of the stator winding. An induction motor's rotor can either be of the wound type or squirrel-cage type.

In wound-rotor motors, the rotor windings are connected through slip rings to external resistances. This is why this type of motor is also referred to as a slip ring motor. During startup, the external resistances reduce the field strength at the stator. As a result, the current in the stator winding is limited to the nominal current. When the motor reaches full speed, the rotor poles are switched to short circuit.

The slip rings are connected to the windings of the rotor by electric cables. The rotor has a hollow shaft comprising an open end. Electric cables connecting the rotor windings to the slip rings run through the hollow shaft.

Since the electric cables rotate with the rotor, for example at 1,500 to 1,800 rounds per minute, the electric cables see substantial centrifugal forces and vibrations. It has been found that the electric cables are subjected to wear and tear at the point where they exit the hollow shaft.

An object of the present invention is to provide an improved rotor for a slip ring motor.

This object is achieved by a rotor for a slip ring motor, the rotor comprising a hollow shaft having an open end, a plurality of electric cables and a cable guide arranged in the open end guiding the electric cables from inside the hollow shaft towards connection points of the electric cables outside the hollow shaft.

One concept on which the present invention is based consists of providing a cable guide which ensures proper guiding of the electric cables from inside the hollow shaft towards the connection points outside of the hollow shaft. This kind of guidance reduces wear and tear on the electric cables due to centrifugal force and vibration. Thus, the reliability of the rotor is increased.

The connection points of the electric cables outside of the hollow shaft may be formed by contact bolts arranged parallel to the rotor axis. The electric cables may be connected by cable shoes at respective ends to an associated contact bolt. A ring element made of an insulator material, for example glass fiber composite, may be provided. The ring element may be provided with holes, and associated contact bolts may reach through each hole. The cable shoes are connected to each contact bolt on an axial phase of the ring element, preferably.

Each electric cable may be comprised of a conductor, for example made of copper, inside a sheath or insulator, e.g. made of a plastic material. Each cable is, preferably, configured to conduct currents larger than 1 kA, for example 2 to 3 kA. To this end, the diameter of the conductor may range between 0.5 cm to 2 cm, for example.

Preferably, the cable guide or one or more of its members are made of a plastic material, for example glass fiber composite, The cable guide is a separate component fastened to the hollow shaft by fastening means, for example using a positive fit or adhesive.

According to an embodiment, the cable guide has an inside surface which is funnel-shaped, the electric cables lying against the inside surface.

First portions of the electric cables are guided inside the hollow shaft and are oriented axially, i.e. parallel to the axis of rotation of the rotor. Second portions of the electric cables are bent and connect the first portions to third portions of the electric cables. The third portions connect the second portions with the connection points outside of the hollow shaft. The second cable portions flare outwardly (i.e., in the radial direction, the radial direction referring to a direction perpendicular to the axis of rotation of the rotor) with respect to the first portions. The inside surface with the funnel shape provides a geometry which corresponds to the geometry of the electric cables described above and thus supports them.

According to a further embodiment, the inside surface is configured to change the orientation of the electric cables by 70° to 90°.

Thus, each cable may comprise a second portion bent to describe a turn of 70° to 90°, preferably 85° to 90°.

According to a further embodiment, each electric cable is guided inside an associated recess inside the cable guide.

Each recess may be configured to partially or completely take up an associated cable, i.e. a cable lies with its diameter partially or completely inside a recess.

According to a further embodiment, the cable guide comprises a ring member and a funnel member connected to said ring member, the ring member comprising the recesses and the funnel member comprising the inside surface.

Advantageously, two elements are provided, the first element (funnel member) providing for the change of direction of the electric cable and the second element (ring member) providing, preferably together with a third element (fixing member), for additional hold of the electric cables (by providing recesses).

According to a further embodiment, the cable guide further comprises a fixing member releasably fixing the electric cables to the ring member.

This takes load away from the connection points outside of the hollow shaft. Since without the fixing member, the centrifugal load and vibrations must be compensated fully at the connection points. By now taking the load away from the connection points, these can be designed so to provide an optimal electric connection. Only much reduced loads need to be taken up with this design at the connection points.

According to a further embodiment, the fixing member is attached, in particular bolted, to the ring member.

This provides for a simple design. Bolting has the advantage of providing a simple and at the same time releasable connection. The fixing member may provide a positive fit in the axial direction. Thus, the fixing member and the ring member together prevent a movement of the electric cables in the axial direction. In addition, the fixing member together with the ring member may provide for a positive fit in the radial direction and/or frictionally locking of the electric cables in the radial direction. In order to provide the frictional locking, the fixing member may, when attached to the ring member, radially squeeze each electric cable (radially referring to each cable axis). Thus, the elastic and frictional properties of the cable sheath are used to provide the frictional locking.

According to a further embodiment, the fixing member fixes the cable inside the recesses.

Preferably, the fixing member is designed so as to close an open side of each recess in the ring member. The open sides of each recess may face in the axial direction. The electric cables are mounted through each open side inside each recess.

According to a further embodiment, the fixing member is configured as a ring.

Preferably, the fixing member is made of an insulating material, for example glass fiber composite. The fixing member may be provided with axial holes through which bolts for attaching the fixing member to the ring member may be inserted. The holes may be spaced equally in the circumferential direction along the ring.

According to a further embodiment, the fixing member has recesses, wherein each cable is, at Least partially, arranged inside an associated recess in the fixing member.

For example, the fixing member may be configured as a (flat) ring with no recesses. In this case, the electric cables are arranged completely inside associated recesses in the ring member. Yet, according to a preferred embodiment, the fixing member itself has recesses complementing the recesses of the ring member so as to form a closed recess in the radial direction with respect to a corresponding cable axis.

According to a further embodiment, the funnel member, the ring member and/or the fixing member are formed as separate parts.

Preferably, the cable guide is comprised of the funnel member, the ring member and/or the fixing member, These parts may be formed as a single component, the cable guide thus being manufactured as one piece, for example cast as a single plastic component. In an alternative embodiment, the funnel member and the ring member may be formed as first component (manufactured in one piece), and the fixing member may be formed as a second component. In this case, the cable guide is made of two separate components. Yet, according to preferred embodiment, the cable guide is made of three separate components, namely the funnel member, the ring member and the fixing member.

According to a further embodiment, the rotor further comprises an adaptor unit having a flange, wherein the cable guide is attached to the flange.

The adaptor unit may, at the same time, be configured to attach the ring element comprising the connection points for the electric cables and/or the contact bolts to the hollow shaft. By using a flange to connect the cable guide to the hollow shaft, a simple design is provided.

According to a further embodiment, the electric cables are arranged in groups, wherein a circumferential distance between adjacent electric cables within one group is smaller than a circumferential distance between adjacent electric cables of different groups.

The electric cables of a respective group may have the same electric phase. This kind of spacing is advantageous with respect to a desired arrangement of male and female contact elements configured to selectively switch windings of the rotor to short circuit.

According to a further embodiment, the electric cables are arranged symmetrically with respect to an axis of symmetry perpendicular to the axis of rotation of the rotor.

Furthermore, a slip ring motor, in particular with the power output of >1 or >10 Megawatt (MW), comprising a rotor as described above is provided.

The embodiments of features described with reference to the rotor of the present invention apply mutatis mutandis to the slip ring motor.

Herein, "perpendicularly" or "at right angles" preferably includes deviations of up to 20°, preferably up to 10° and more preferably up to 3° from a line being perpendicular or at right angles.

"A" or "one" element is not to be understood as limited to only one element, but more than one element, for example two, three or more elements may be provided. By the same token, "two" or any other wording herein related to specific numbers is not to be understood as being limited to that number of elements only, but any other number of elements may be provided.

Further possible implementations or alterative solutions of the invention also encompass combinations—that are not explicitly mentioned herein—or features described above or below with regard to the embodiments. The person skilled in the art may also add individual or insulated aspects and features of the most basic form of the invention.

Further embodiments, features and advantages of the present invention will become apparent from the subsequent description and dependent claims, taking in conjunction with the accompanying drawings.

In the Figures, like reference numerals designate like or functionally equivalent elements, unless otherwise indicated.

FIG. 1 shows, in a partial section view, a slip ring motor I in accordance with an embodiment of the present invention.

Figure 1:
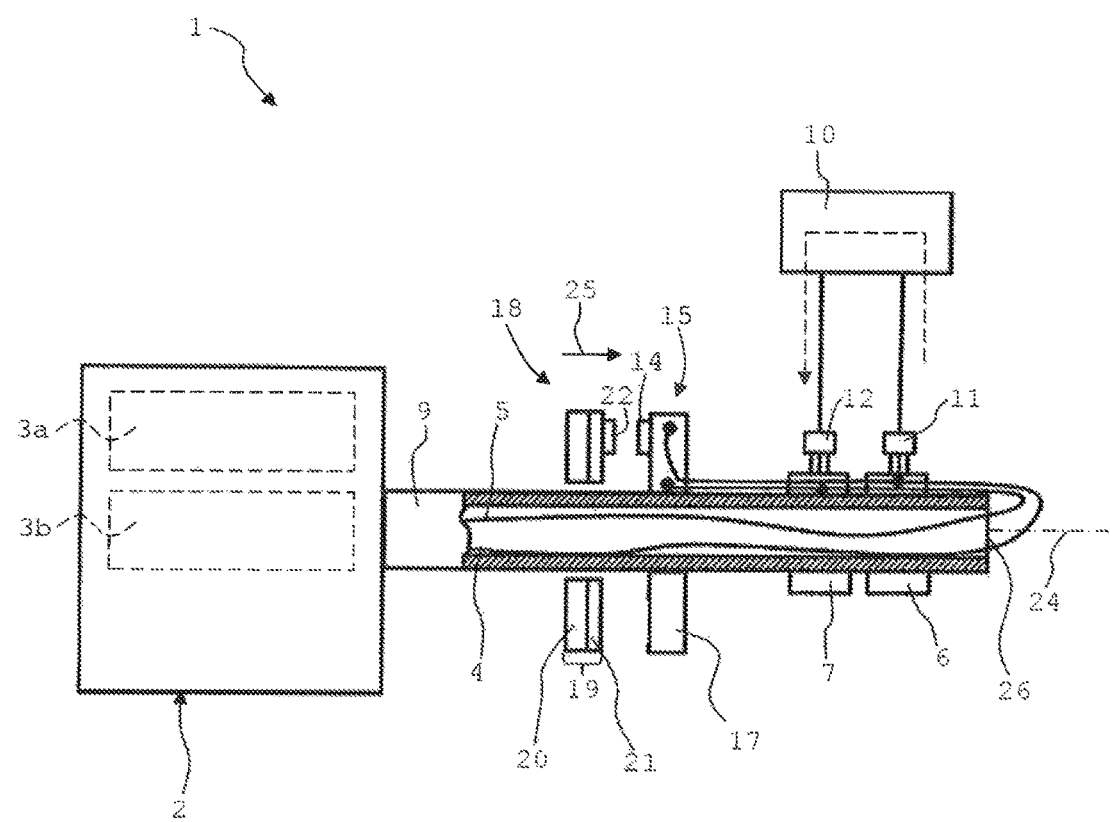
FIG. 1 shows, in a partial section view, a slip ring motor according to an embodiment.

The slip ring motor 1 drives a compressor (not shown) used in an air separation plant, for example. The slip ring motor 1 comprises a rotor 2 arranged inside a stator (not shown). The rotor 2 is of the wound type. The rotor 2 comprises multiple windings 3a, 3b. The windings 3a, 3b are connected by a first and a second electric cable 4, 5 to a first and a second slip ring 6, 7. In order to simplify representation, only two cables 4, 5 and two slip rings 6, 7 are shown in FIG. 1. Typically, six or more cables and corresponding slip rings are provided.

The cables 4, 5 are guided from the windings 3a, 3b to the slip rings 6, 7 inside a hollow shaft 9 (shown in partial section) of the rotor 2. The slip ring 6, 7 are rotationally fixed to the shaft 9 so as to rotate with the same. The slip ring 6, 7 are contacted by brushes 11, 12, respectively. The brushes 11, 12 are stationary and connected electrically to an external resistance 10.

The cable 4 is shown to be connected to the slip ring 6, and the cable 5 is connected to the slip ring 7. Further, the cable 4 is connected, preferably by a contact bolt 47 shown in FIG. 4, to a male contact element 14 of a first rotating unit 15 (see FIG. 3), and the cable 5 is connected, preferably by another contact bolt 47, to a male contact element 16 of the first rotating unit 15, Black dots in FIGS. 1 and 3 indicate points of electrical connection of the cables 4, 5 or contact bolts 47.

Figure 3:
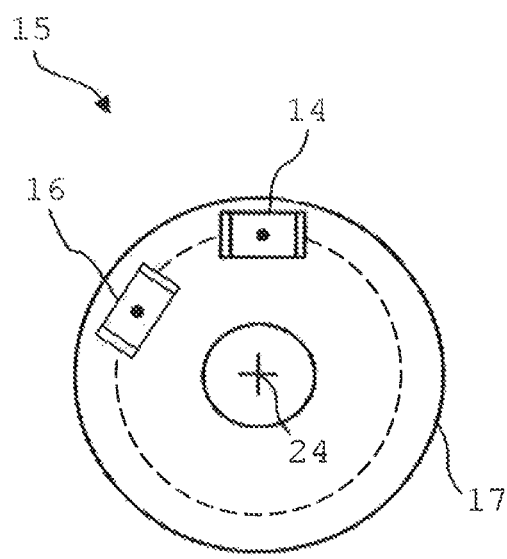
FIG. 3 show, in an axial view, a second ring unit from FIG. 1 comprising male contact elements.

The rotating unit 15 may comprise a ring 17 as seen in the axial view of FIG. 3. The ring 17 is made of a material electrically insulating the male contact elements 14, 16 against each other, For example, the ring 17 is made of glass fiber composite.

Figure 2:
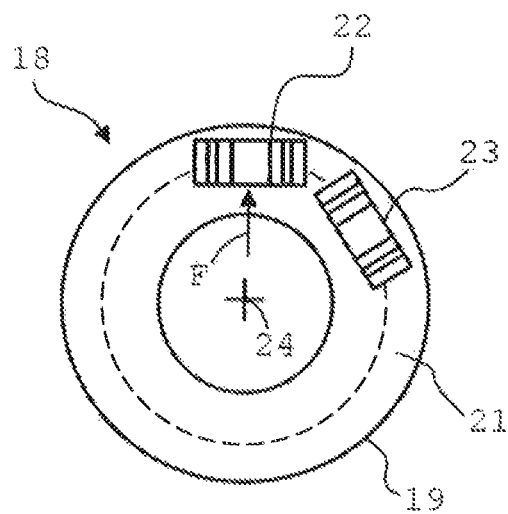
FIG. 2 shows, in an axial view, a first ring unit from FIG. 1 comprising female contact elements.

Further, the slip ring motor 1 comprises a second rotating unit 18 shown in an axial view in FIG. 2. The second rotating unit 18 comprises a ring 19. The ring 19 is made up of a base ring element 20 (see FIG. 1) and a conducting ring element 21. The base ring element 20 is configured as an electrical insulator, for example made of glass fiber composite. The conducting ring element 21 on the other hand is made of a conducting material, for example copper. Female contact elements 22, 23 (see FIG. 2) are attached to the conducting ring element 21, wherein electrical connection is made between the female contact elements 22, 23 and the conducting ring element 21.

Of course, the first rotating unit 15 may comprise more than two, for example six to twelve male contact elements, and the second rotating unit 18 may comprise more than two, for example six to twelve female contact elements, as indicated by the dotted lines in FIGS. 2 and 3. For illustration purposes, only two such elements are shown in FIGS. 2 and 3, respectively.

Both rotating units 15, 18 are attached to the shaft 9 so as to rotate with the same. Yet, the first rotating unit 15 is also fixed axially to the shaft 9, whereas the second rotating unit 18 is configured to be moved along the axis 24 on the hollow shaft 9.

FIG. 1 shows a first state in which the first and second rotating unit 15, 18 are spaced apart from each other such that the male and female contact elements 14, 16, 22, 23 are disengaged from one another, Thus, the cables 4, 5 and the corresponding windings 3a, 3b are not switched to short circuit. Consequently, the inrush current induced during startup of the slip ring motor 1 passes from the winding 3a through the cable 4, via the slip ring 6 and the brush 11 into the external resistance 10. The external resistance 10 may comprise an electrolyte or any other high-resistance material. After passing through the external resistance 10, the current returns to the winding 3b via the brush 12, the slip ring 7 and the cable 5. The path of the current through the external resistance 10 is indicated by a dashed arrow.

When the slip ring motor 1 has started up, i.e. as the rounds per minute of the rotor 2 increase a certain threshold, the current through the cables 4, 5 becomes smaller. Thus, it is desirable to switch off the external resistance 10 when the slip ring motor 1 has reached its nominal speed. To this end, the second rotation unit 18 is moved in the direction 25 along the axis 24 into a second state (not shown), in which the male contact elements 14, 16 engage the female contact elements 22, 23. Consequently, the cables 4, 5 are switched to short circuit since the current goes from the cable 4 through the male contact element 14 into the female contact element 22, through the conducting ring element 21 and via the female contact element 23 and the male contact element 16 into the cable 5.

Even though presently only explained with respect to a single phase and/or a single pair of windings 3a, 3b, the same principle holds for the other phases and/or other pairs of windings.

Figure 4:
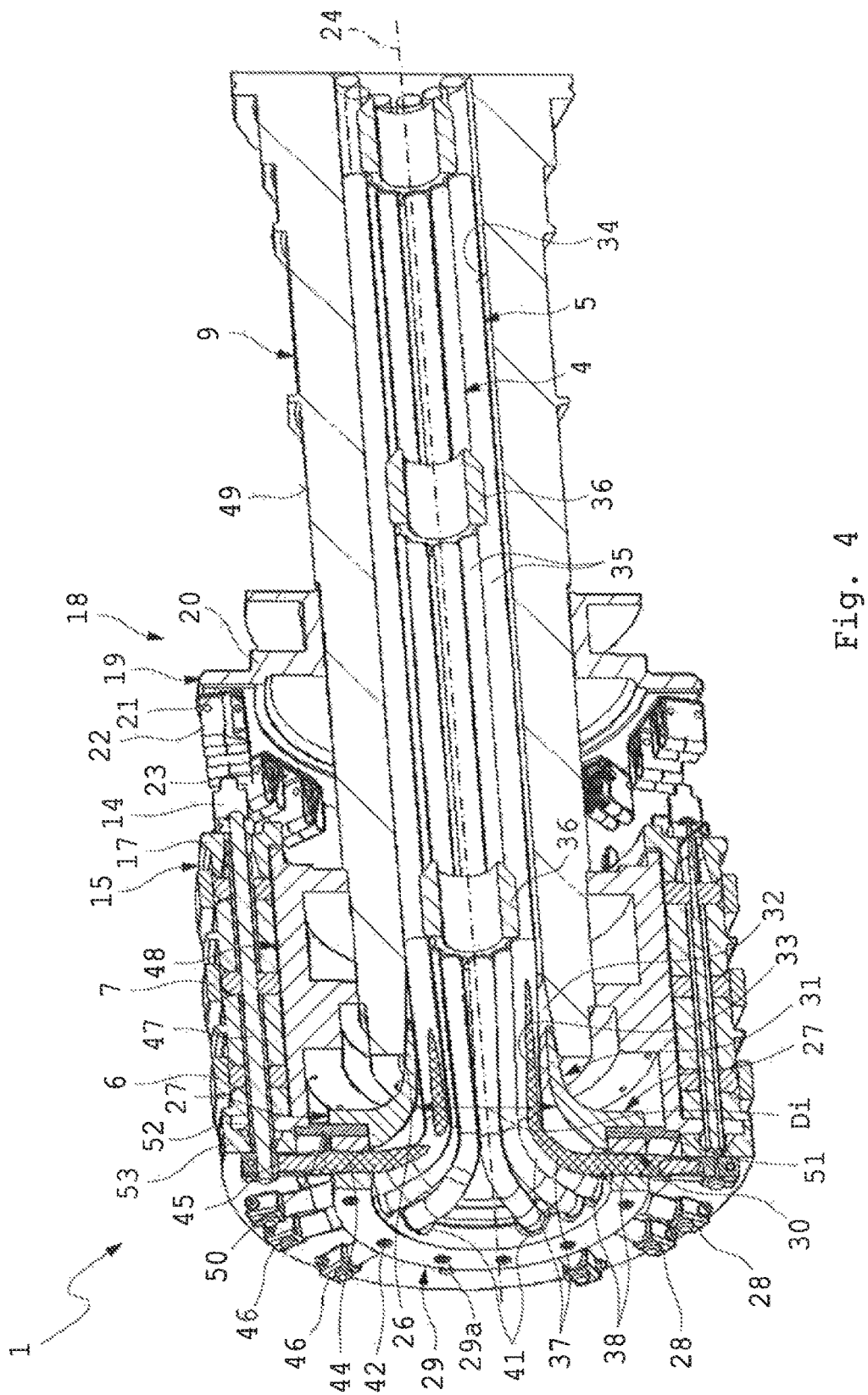
FIG. 4 shows, in a perspective view, a section of a rotor of the slip ring rotor of FIG. 1.

FIG. 4 shows, in a perspective view, a section view of the rotor 2 of FIG. 1. Yet, the embodiment of FIG. 4 provides a lot more detail than the more general embodiment of FIG. 1.

The hollow shaft 9 shown in FIG. 4 has an open end 26. A cable guide 27 is arranged in the open end 26. The cable guide 27 guides the cables 4, 5 (no reference signs were given to the other cables to simplify representation) from inside the hollow shaft 9 towards connection points 28 of the cables 4, 5 outside of the hollow shaft 9.

Figure 5:
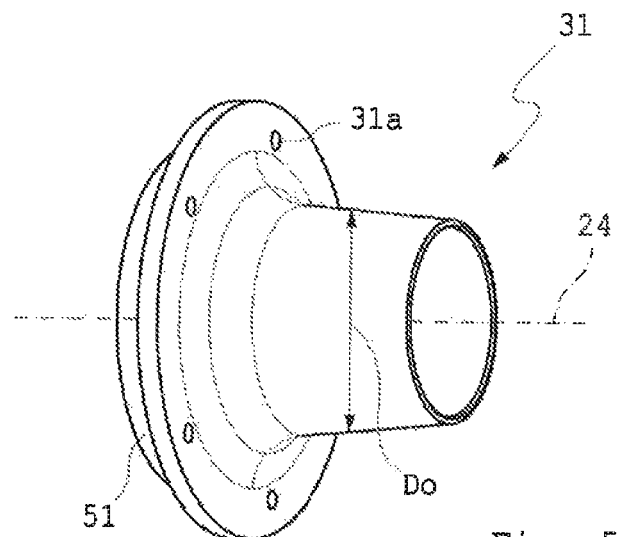
FIG. 5 shows, in a rear side and perspective view, a funnel member from FIG. 4.
Figure 6:
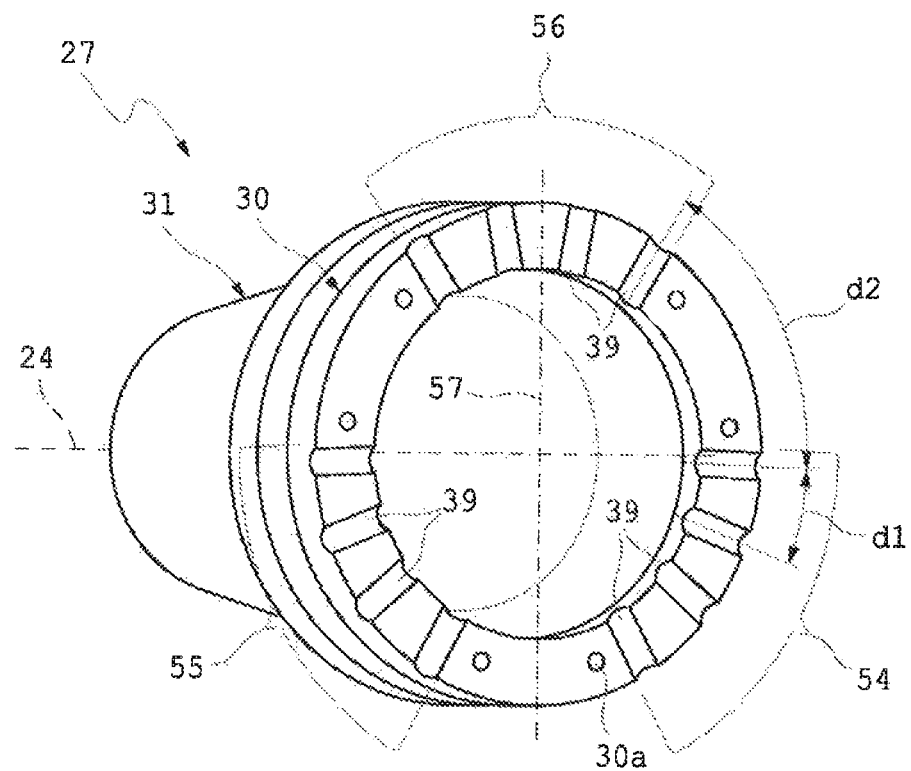
FIG. 6 shows, in a front end perspective view, the funnel member of FIG. 5 and a ring member of FIG. 4.

The cable guide 27 is shown—partially—in a perspective rear view in FIG. 5 and in a perspective front view in FIG. 6. The design of the cable guide 27 will be explained with reference to FIGS. 4, 5 and 6 hereinafter.

The cable guide 27 comprises a fixing member 29, a ring member 30 and a funnel member 31, each portion 29, 30, 31 formed as a separate part, for example. The funnel member 31 tapers down from the ring member 30 in the axial direction, i.e. along the axis of rotation 24 of the rotor 2. Thus, an outside diameter $D_o$ (see FIG. 5) of the funnel member 31 becomes smaller in the axial direction. An inside diameter $D_i$ of an inside surface 33 of the funnel member 31 is also shown to decrease in the axial direction 24 away from the ring member 30. Consequently, the funnel member 31 and, in particular, the inside surface 33 is funnel-shaped.

In the assembled state, the funnel member 31 is partially inserted into the open end 26 of the hollow shaft 9 In particular, the open end 26 may include a chamfer 32 on the inside which corresponds to the taper of the funnel member 31. Thus, the funnel member 31 fits snugly into the open end 26, Due to this design, the inside surface 33 of the funnel member 31 is flush with the inside surface 34 of the hollow shaft 9 adjacent to the chamfer 32 along the axis of the rotation 24. Therefore, first portions 35 of the cables 4, 5 lying radially against the inside surface 34 of the hollow shaft 9 do not experience a change in direction at the point where they enter the funnel member 33 of the cable guide 27. Spacers 36 may be provided holding the first portions 35 of the cables 4, 5 radially against the inside surface 34. In addition, the cavity formed inside the hollow shaft 9 which is not filled out by the cables 4, 5 or the spacers 36 may be filled with a plastic material, for example a hardened epoxy resin.

Once the cables 4, 5 enter the funnel member 31, the inside surface 33 of the funnel member 31 guides second portions 37 of the cables 4, 5 more and more outward in the radial direction. The "radial" direction herein refers to a direction perpendicular to the axis of rotation 24. The inside surface 33 is curved so as to describe a 90° turn. Accordingly, the second portions 37 of the cables 4, 5 lying against the inside surface 33 are also formed with a 90° bend. Third portions 38 of the cables 4, 5 connected to the second portions 37 are oriented radially and reach towards the contact connection points 28.

As seen in FIG. 6, the ring member 30 may be configured as a ring having recesses 39. The recesses 39 are formed as radially extending grooves. The recesses 39 have a semicircular cross-section, for example. The third portions 38 of the cables 4, 5 are arranged, with part of their length, inside the recesses 39, respectively.

The fixing member 29 (only illustrated in FIG. 4) may be formed as a ring, The fixing member 29 has recesses 41, also formed as radially extending grooves with semicircular cross-sections, for example. Thus, the recesses 39 in the ring member 30 and the recesses 41 in the fixing member 29 complement one another to form closed holes through which an associated cable 4, 5 extends.

The fixing member 29 is fastened to the ring member 30 and the funnel member 31 by bolts 42. To this end, the fixing member 29 and the ring member 30 have holes 29a, 30a (see FIGS. 4 and 6) through which the bolts 42 extend. The bolts are screwed into holes 31a (see FIG. 5) in the funnel member 31, preferably.

It is preferred that fastening of the bolts 42 results in a friction lock in the radial direction between the fixing member 29 and the ring member 30 on the one hand and the third portions 38 of the cables 4, 5 on the other hand. This friction lock results from the radial pressure on each cable 4, 5, compressing an elastic cable sheath 44 of a respective cable 4, 5 inside of which a respective conductor 45, for example made of copper, runs. In addition to the frictional locking, each cable 4, 5 is axially fastened by a positive fit formed by the corresponding recesses 39, 41.

The conductors 45 are connected by cable shoes 46 to contact bolts 47, for example made of copper, electrically connecting the cables 4, 5 to the slip rings 6, 7 and to the male contact elements 14, 16.

For assembly, the third portions 38 of the cables 4, 5 are placed inside the recesses 39. Thereafter, the fixing member 29 is placed over the third portions 38 of the cables 4, 5 such that the portions of the cables 4, 5 protruding from the recesses 39 come to lie inside the recesses 41 of the fixing member 29. Then, the bolts 42 are fastened to attach the fixing member 29. Of course, the bolts 42 may be released, for example, in order to replace or repair one of the cables 4, 5.

An adapter 48 is mounted to an outside surface 49 of the shaft 9, The adaptor 49 has a flange 50 extending radially inward and engaging a shoulder 51 (also see FIG. 6) on the funnel member 31 of the cable guide 27. The funnel member 31 is arranged on one side of the flange 50. The ring member 30 is arranged on the other side of the flange 50. The flange 50 has holes (not shown) through which the bolts 42 extend as well. Thus, the cable guide 27 is—altogether—attached to the flange 50.

In addition to the flange 50, the adapter 48 may comprise a flange 52. An insulator ring 53, preferably made of plastic material, for example glass fiber composite, may be attached to the flange 52. The ring 53 insulates the connection points 28 with respect to the adapter 48 as well as with respect to the slip rings 6, 7.

As seen in FIGS. 4 and 6, the recesses 39 and therefore the third portions 38 of the cables 4, 5 may be arranged in groups 54, 55, 56. A distance d1 in the circumferential direction (with respect to the axis of rotation 24) between two adjacent recesses 39 is smaller than a circumferential distance d2 between adjacent recesses 39 of different groups 54, 55, 56. The recesses 39 and therefore the third portions 38 of the cables 4, 5 may be arranged symmetrically with respect to an axis 57 (see FIG. 6) perpendicular to the axis 24 of rotation.

Although the present invention has been described in accordance with preferred embodiments, it is obvious for the skilled person in the art that modifications are possible in all embodiments.

LIST OF REFERENCE NUMERALS 1 slip ring motor
2 rotor
3a, 3b windings
4 cable
5 cable
6 slip ring
7 slip ring
9 shaft
10 external resistance
11 brush
12 brush
14 male contact element
15 rotating unit
16 male contact element
17 ring
18 rotating unit
19 ring
20 base ring element
21 conducting ring element
22 female contact element
23 female contact element
24 axis
25 direction
26 open end
27 cable guide
28 connection point
29 fixing member
29a hole
30 ring member
30a hole
31 flannel member
31a hole
32 chamfer
33 inside surface
34 inside surface
35 portion
36 spacer
37 portion
38 portion
39 recess
41 recess
42 bolt
44 sheath
45 lead
46 cable shoe
47 contact bolt
48 adapter
49 outside surface
50 flange
51 shoulder
52 flange
53 ring
54 group
55 group
56 group
57 axis of symmetry
d1, d2 distances
$D_i$ inside diameter
$D_o$ outside diameter

The invention claimed is:

1. A rotor for a slip ring motor, comprising
a hollow shaft having an open end,
a plurality of electric cables, and
a cable guide arranged in the open end guiding the electric cables from inside the hollow shaft towards connection points of the electric cables outside the hollow shaft, wherein the cable guide comprises
a ring member and a funnel member connected to said ring member, the ring member including recesses and the funnel member including an inside surface, and
a fixing member releasably fixing the electric cables to the ring member, wherein the fixing member is bolted to the ring member.

2. The rotor of claim 1, wherein the inside surface of the funnel member has the electric cables lying against the inside surface.

3. The rotor of claim 2, wherein the inside surface is configured to change the orientation of the electric cables by 70° to 90°.

4. The rotor of claim 2, wherein each electric cable is guided inside an associated recess inside the cable guide.

5. The rotor of claim 1, wherein the fixing member fixes the electric cables inside the recesses.

6. The rotor of claim 1, wherein the fixing member is configured as a ring.

7. The rotor of claim 1, wherein the fixing member has recesses, wherein each electric cable is, at least partially, arranged inside an associated recess in the fixing member.

8. The rotor of claim 1, wherein the funnel member, the ring member and the fixing member are formed as separate parts.

9. The rotor of claim 1, further comprising an adaptor unit having a flange, wherein the cable guide is attached to the flange.

10. The rotor of claim 1, wherein the electric cables are arranged in groups, wherein a circumferential distance between adjacent electric cables within one group is smaller than a circumferential distance between adjacent electric cables of different groups.

11. The rotor of claim 10, wherein the electric cables are arranged symmetrically with respect to an axis of symmetry perpendicular to the axis of rotation of the rotor.

12. A slip ring motor having a power output of >1 MW, comprising a rotor having
a hollow shaft having an open end,
a plurality of electric cables, and
a cable guide arranged in the open end guiding the electric cables from inside the hollow shaft towards connection points of the electric cables outside the hollow shaft, wherein the cable guide comprises
a ring member and a funnel member connected to said ring member, the ring member including recesses and the funnel member including an inside surface, and
a fixing member releasably fixing the electric cables to the ring member, wherein the fixing member is bolted to the ring member.

13. A rotor for a slip ring motor, comprising
a hollow shaft having a longitudinal axis and an open end,
a plurality of electric cables extending through said hollow shaft and passing through said open end,
a cable guide for guiding the electric cables from inside the hollow shaft and through said open end to connection points outside the hollow shaft, wherein guide comprising a ring member and a funnel member connected to said ring member, said funnel member being positioned within said open end, the ring member comprising and said electric cables being positioned within recesses, and
a ring shaped fixing member attached to the ring member, said fixing member having recesses complementing the recesses of the ring member so that the recesses of the ring member and the recesses of the fixing member form closed recesses in the radial direction with respect to the longitudinal axis of the hollow shaft,
wherein said electric cables are arranged in the closed recesses formed by the recesses of the fixing member and the ring member.

* * * * *